3,118,320
TRANSMISSION CONTROLS
John S. Ivey, Muncie, Ind., assignor to Borg-Warner Corporation, Chicago, Ill., a corporation of Illinois
Filed May 25, 1961, Ser. No. 112,645
5 Claims. (Cl. 74—472)

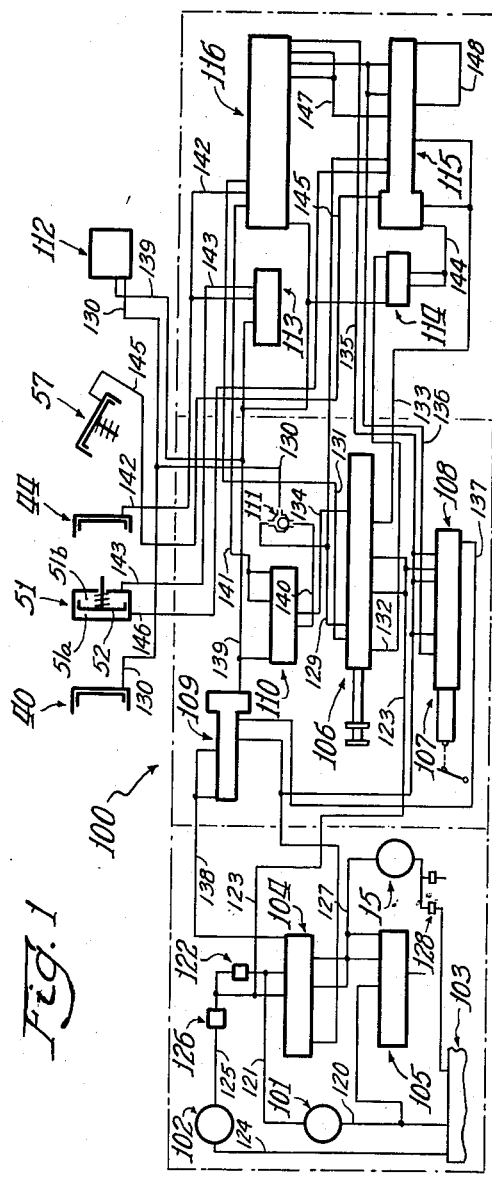

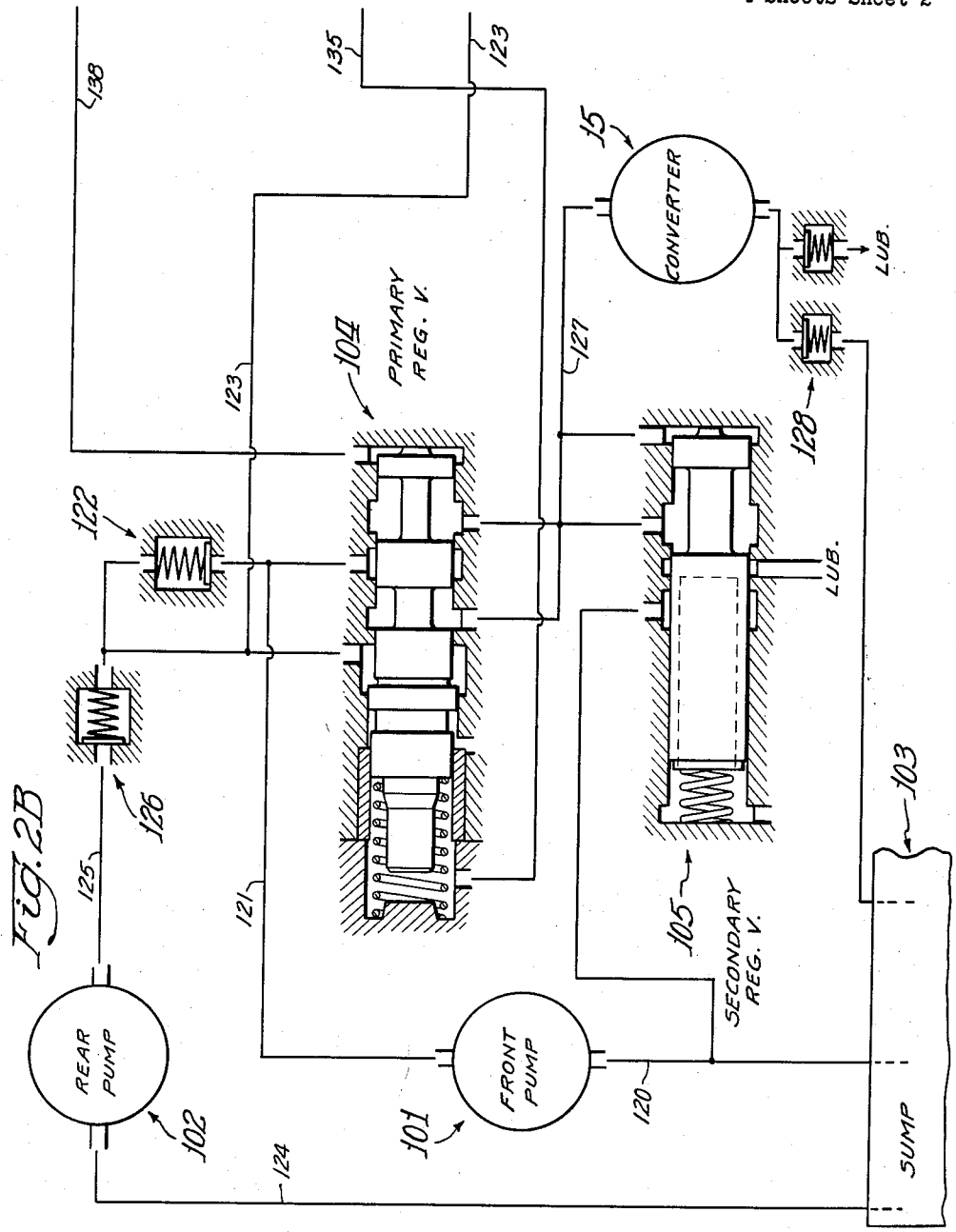

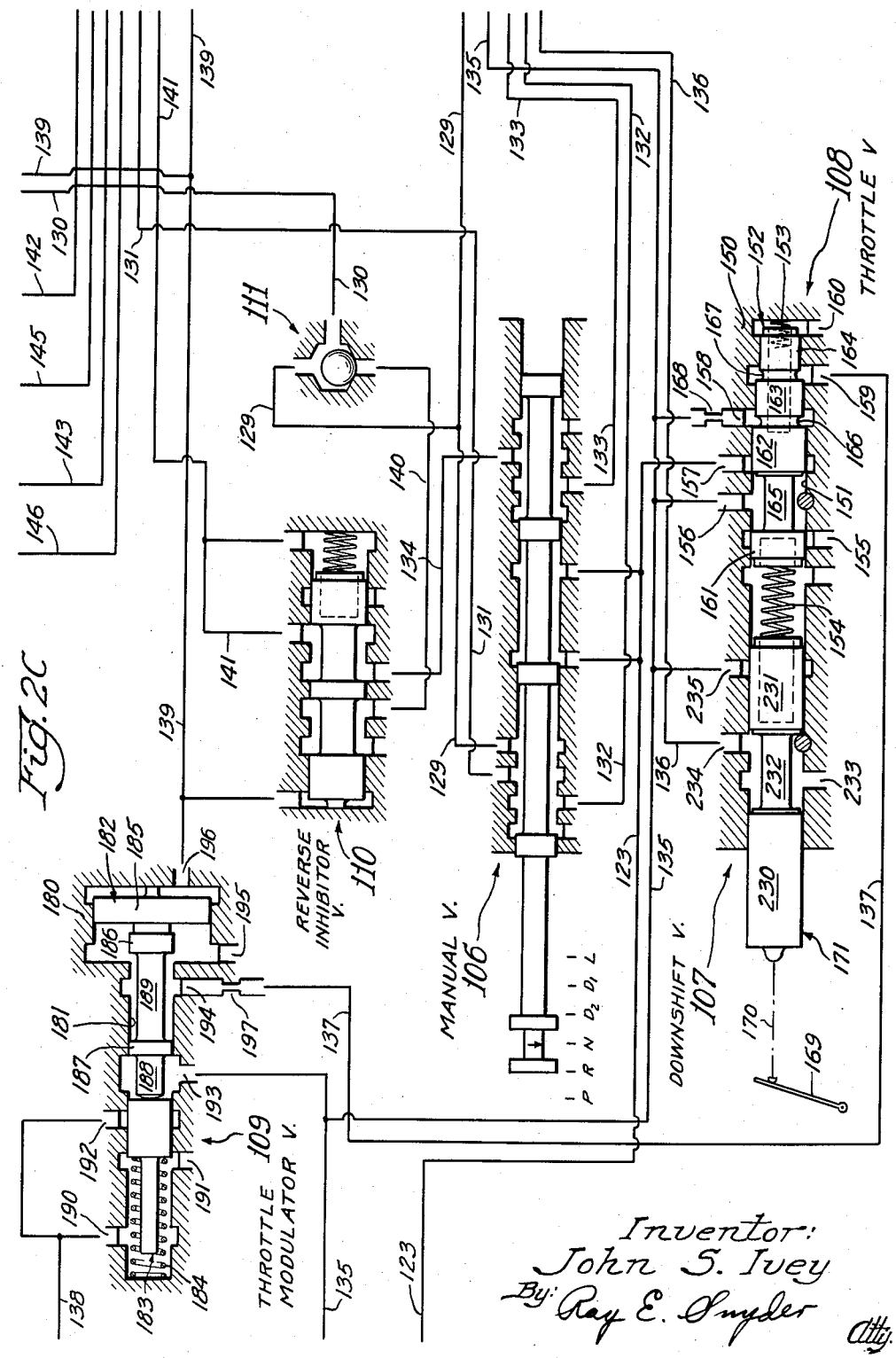

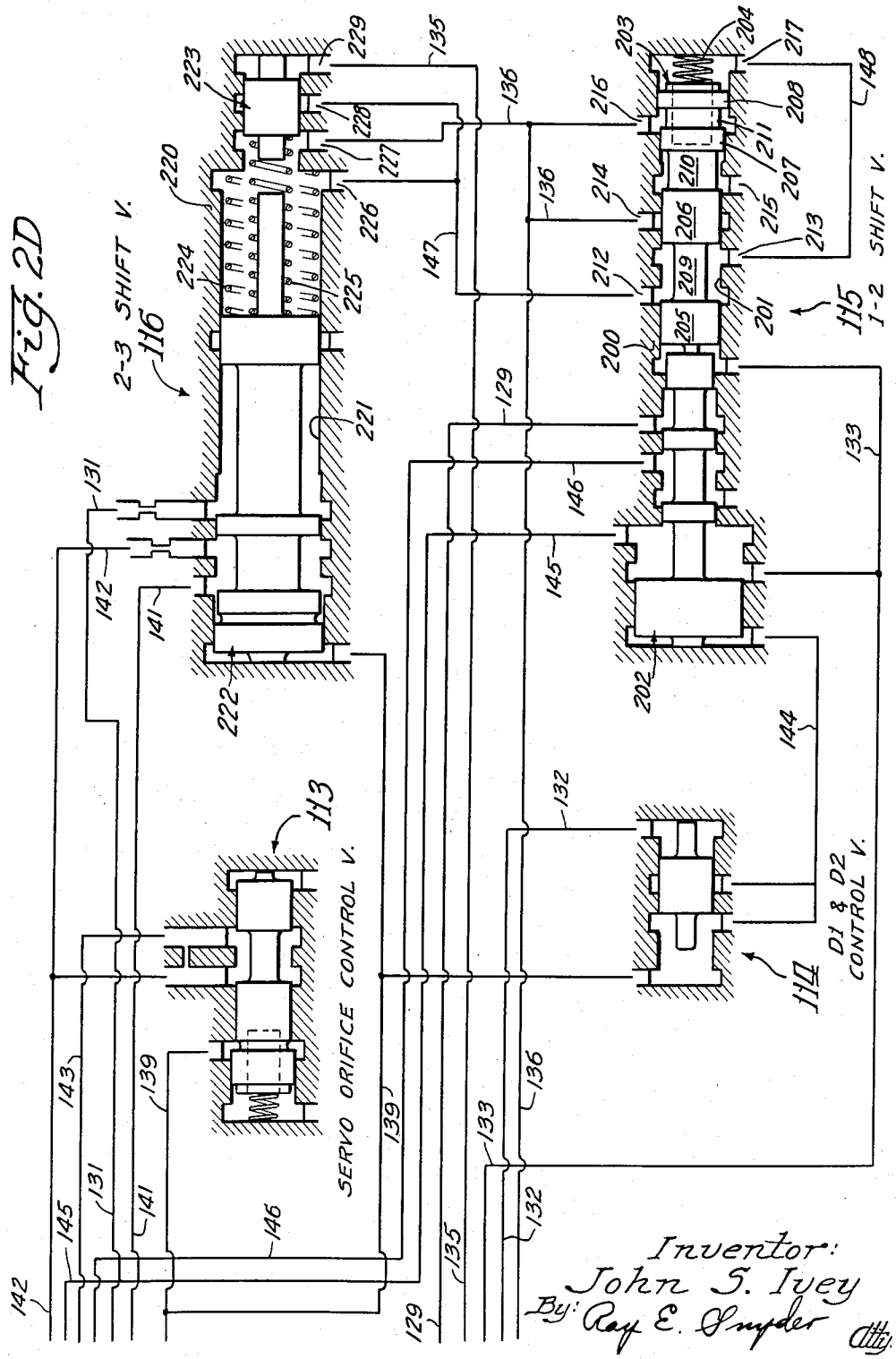

This invention relates to an automatic transmission control system for use in automotive vehicles.

The present invention constitutes an improvement of the transmission control system disclosed in my copending application Serial Number 12,771 filed March 4, 1960.

It is an object of the present invention to provide an improved transmission control system giving desirable shift qualities under all driving conditions.

It is also an object to provide an improved control system including a pressure regulator valve for regulating the line pressure supplied to the system, a throttle actuator responsive valve for providing a modifying pressure to the regulator valve, and valve means for substantially increasing the line pressure for initially starting the vehicle in forward drive and for reverse drive condition.

It is another object to provide a line pressure regulating valve, a throttle actuator responsive valve for providing a throttle pressure effective on the regulating valve for varying line pressure with throttle actuator depression, a modulator valve responsive to vehicle speed and supplied with fluid from the throttle valve that also supplies fluid to the regulating valve and to the throttle valve for modifying both line pressure and throttle pressure.

It is another object to provide a shift valve for effecting the 1-2 and 2-1 shifts of the transmission that is supplied with fluid from the throttle valve, said shift valve being formed with lands of different areas responsive to throttle pressure whereby different shift points are provided for the 1-2 light throttle upshift, the 1-2 forced throttle upshift, and the 2-1 forced throttle downshift.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIGURE 1 is an over all schematic view of the hydraulic control system of the present invention; and FIGURE 2 is a layout diagram of FIGURES 2A, 2B, 2C and 2D which disclose the control system in greater detail.

The transmission mechanism with which the present control system is adapted to be used is shown schematically in FIGURE 2A and is more particularly described in my co-pending application Serial Number 12,771. The transmission mechanism is designated generally by the numeral 10 and comprises an input shaft 11 and an output shaft 12, a first intermediate shaft 13, and a second intermediate shaft 14, all coaxially aligned. In addition, the transmission 10 comprises a fluid torque converter 15, a planetary gear set 16, a front clutch 17, a rear clutch 18, a front brake 19, a rear brake 20, and a one-way brake 21.

The torque converter 15 comprises a driving element or impeller 22, a driven element or turbine 23, and a reaction element or stator 24. The impeller 22 is connected to be driven by the drive shaft 11; the turbine 23 is connected to the first intermediate shaft 13; and the stator 24 is connected through a one-way brake 25 to a transmission casing 26.

The planetary gear set 16 comprises a first sun gear 30, a second sun gear 31, a plurality of long planet gears 32, a plurality of short planet gears 33, a planet gear carrier 34, and a ring gear 35. The short planet gears 33 are in mesh with the sun gear 30 and with the long planet gears 32; and the long planet gears 32 are in mesh with the sun gear 31 and ring gear 35. The sun gear 30 is connected with the second intermediate shaft 14 and the ring gear 35 is connected to the output shaft 12.

The front clutch 17 comprises a fluid pressure servomotor 40 for engaging the clutch, an outer shell 41, an inner hub 42 and a plurality of interleaved friction discs 43. The outer shell 41 is connected to the first intermediate shaft 13 and the inner hub 42 is connected to the second intermediate shaft 14.

The rear clutch 18 comprises a fluid pressure actuated servomotor 44 for engaging the clutch, an outer shell 45, an inner hub 46, and a plurality of interleaved friction discs 47. The inner hub 46 is connected to the outer shell 41 of the clutch 17, and the outer shell 45 is connected to the second sun gear 31 of the planetary gear set 16.

The front brake 19 comprises a friction band 50, adapted to engage the outer shell 45 of the rear clutch 18 for holding the sun gear 31, and a fluid pressure actuated servomotor 51 for applying the brake 19. The servomotor 51 is divided into two cavities, an apply cavity 51a and a disapply cavity 51b, the two cavities being separated by a movable piston 52 which acts on the brake band 50.

The rear brake 20 comprises a friction band 55 adapted to engage a brake drum 56 and a fluid pressure servomotor 57 for applying the band 55. The drum 56 is connected to the planet gear carrier 34 and is effective when the brake 20 is engaged to hold the carrier 34 for certain driving gear ratios to be described hereinafter.

The one-way brake 21 is interconnected between the planet gear carrier 34 and the transmission casing 26 and is effective to hold the carrier 34 for normal low speed start.

*Mechanical Operation*

The transmission mechanism 10 provides three forward drive gear ratios and a reverse drive, and also has a neutral condition. Neutral condition is obtained when all of the brakes and clutches are disengaged.

Low speed forward drive is obtained by engagement of the clutch 17 and of the one-way brake 21. In this condition, driving torque from a driving engine (not shown) is transmitted from the drive shaft 11 through the torque converter 15, the first intermediate shaft 13, the engaged clutch 17 and second intermediate shaft 14 to the sun gear 30. The one-way brake 21 holds the planet gear carrier 34 so that it serves as a reaction element for the gear set 16 and the ring gear 35 is driven by the planet gears 32 and 33 for driving the output shaft 12.

A subsequent up-shift to second or intermediate speed forward drive is obtained by engagement of the front brake 19. Torque is transmitted to the first sun gear 30 through the clutch 17 as previously described and the engaged brake 19 is effective to hold the sun gear 31 stationary so that it serves as a reaction element for the gear set 16. The one-way brake 21 overruns in this condition and the ring gear 35 is driven by the planet gears 32 and 33 for driving the output shaft 12 at an intermediate speed drive ratio.

A subsequent up-shift to high or direct forward drive is obtained by disengagement of the brake 19 and engagement of the rear clutch 18. In this condition, driving torque is supplied to the first sun gear 30 as previously described and in addition is supplied through the engaged clutch 18 to the second sun gear 31. The engaged clutches 17 and 18 effectively lock together the two sun gears 30 and 31 so that the gear set 16 rotates as a unit and a 1:1 or direct drive ratio is obtained through the transmission.

Reverse drive is obtained by disengagement of the clutch 17 and engagement of the rear clutch 18 and rear brake 20. In this condition, driving torque from the engine is transmitted through the torque converter 15, the intermediate shaft 13, the outer shell 41 of the clutch 17, and through the engaged clutch 18 to the sun gear 31. The brake 20 is effective to hold the planet gear carrier 34 stationary so that it serves as a reaction element for the gear set 16. Forward driving torque supplied through the sun gear 31 is transmitted through the long planet gears 32 for driving the ring gear 35 and the output shaft 12 in the reverse direction.

A manual low speed forward drive condition is obtainable by engagement of the front clutch 17 and rear brake 20. The rear cutch 18 and front brake 19 are disengaged. In this condition, the rear brake 20 functions to hold the planet gear carrier 34 stationary so that it serves as a reaction element for the gear set 16. Low speed forward drive condition is then obtained in the same manner as when the one-way brake 21 is engaged to hold the carrier 34 stationary, except that up-shifts to higher speed ratios are not obtainable unless the manual selector lever is moved to a drive position, as will be described later.

The hydraulic control system for the transmission of FIGURE 2A is shown schematically in FIGURE 1 and is shown in detail in FIGURES 2B, 2C and 2D. The control system is designated generally by the numeral 100 and includes a front pump 101 connected to be driven by the drive shaft 11 and a rear pump 102 connected to be driven by the driven shaft 12. A fluid supply reservoir or sump 103 is formed on the bottom interior of the transmission casing 26 and contains the working fluid for the control system 100.

The hydraulic control system 100 also includes the torque converter 15 and the following valves:

104—Primary regulator value
105—Secondary regulator valve
106—Manual selector valve
107—Down shift valve
108—Throttle valve
109—Throttle modulator valve
110—Reverse inhibitor valve
111—Ball check valve
112—Governor valve
113—Servo orifice control value
114—D-1 and D-2 control valve
115—1-2 shift valve
116—2-3 shift valve Whenever the vehicle engine is running so as to drive the drive shaft 11, the front pump 101 draws fluid from the sump 103 through a suction line 120 and discharges fluid under pressure into conduit 121. Fuid in the conduit 121 is supplied to a port in the primary regulator valve 104 and is delivered through a front pump check valve 122 into a conduit 123. The conduct 123 will hereinafter be referred to as the line pressure conduit for supplying line pressure to the rest of the control system 100.

Whenever the driven shaft 12 is turning forwardly above some predetermined speed, the rear pump 102 draws fluid from the sump 103 through a conduit 124 and discharges fluid under pressure into a conduit 125. From the conduit 125 fluid passes through a rear pump check valve 126 into the line pressure conduit 123.

The primary regulator valve 104 regulates the line pressure in conduit 123 for various operative conditions of the transmission to be described hereinafter. Part of the fluid supplied to the primary regulator valve 104 is delivered into a conduit 127 for supplying the converter 15. The pressure within the converter 15 is regulated by the secondary regulator valve 105 and fluid is discharged from the converter 15 through a check valve 128 into the sump 103.

Line pressure in the conduit 123 is supplied to the manual selector valve 106 and can be directed by this valve through a plurality of conduits to various other valves and hydraulic servomotors of the transmission.

A conduit 129 is connected to the ball check valve 111 and to the 1-2 shift valve 115. The ball check valve 111 is connected to deliver fluid through a conduit 130 to the front clutch servomotor 40 and to the governor valve 112. The manual valve 106 is also connected by means of a conduit 131 to the 2-3 shift valve 116; by means of a conduit 132 to the D-1 and D-2 control valve 114; by means of a conduit 133 to the 1-2 shift valve 115; and by means of a conduit 134 to the reverse inhibitor valve 110.

The down shift valve 107 is connected by means of a conduit 135 to the throttle valve 108, the throttle modulator valve 109, the right end of the 2-3 shift valve 116, and the left end of the primary regulator valve 104. The down shift valve 107 is also connected by means of a conduit 136 to the 1-2 shift valve 115 and 2-3 shift valve 116.

The throttle valve 108 is connected by means of a conduit 137 to the throttle modulator valve 109, and the valve 109 is connected by means of a conduit 138 to the right end of the primary regulator valve 104. The conduit 135 will hereinafter be referred to as the throttle pressure conduit and the conduit 138 will be referred to as the throttle modulator pressure conduit.

The throttle modulator valve 109 is also connected by means of a conduit 139 to the governor valve 112, the reverse inhibitor valve 110, the servo orifice control valve 113, the D-1 and D-2 control valve 114, and the 2-3 shift valve 116. The conduit 139 is filled with fluid under pressure from the governor valve 112. The pressure in this conduit increases directly as a function of the speed of the driven shaft 12 and this pressure will hereinafter be referred to as governor pressure.

The reverse inhibitor valve 110 is connected by means of a conduit 140 to the ball check valve 111, and by means of a conduit 141 to the 2-3 shift valve 116.

The servo orifice control valve 113 is connected by means of a conduit 142 to the 2-3 shift valve 116 and to the rear clutch servo 44; and by means of a conduit 143 to the disapply cavity 51b of the front brake servomotor 51.

The D-1 and D-2 control valve 114 is connected by means of a conduit 144 to the left end of the 1-2 shift valve 115. The 1-2 shift valve 115 is also connected by means of a conduit 145 to the rear brake servo 57; by means of a conduit 146 to the apply cavity 51a of the front brake servo 51; and by means of a conduit 147 to the 2-3 shift valve 116. The 1-2 shift valve 115 also has a conduit or channel 148 interconnecting two ports on the same bore.

The structure and operation of the control system of my earlier application Serial No. 12,771 has been described in some detail in that application. The description of the present control system will be directed only to the improvements of that control system.

The throttle valve 108 comprises a casing portion 150 formed with a stepped longitudinal cylindrical bore 151, a valve piston 152, and springs 153 and 154. The casing portion 150 is formed with ports 155, 156, 157, 158, 159 and 160 all opening into the bore 151. The valve piston 152 is formed with lands 161, 162, 163 and 164, and annular grooves 165, 166 and 167 between the lands. The lands 162, 163 and 164 are of successively decreasing diameters. The port 156 is connected to conduit 135 and the port 158 is also connected through a restriction 168 to the conduit 135. The port 157 is connected to line pressure conduit 123; port 159 is connected to conduit 137 and ports 155 and 160 are bleed ports open to the sump 103.

The throttle valve piston 152 is moved under the influence of an accelerator pedal or throttle actuator 169 acting through a suitable linkage 170, the downshift valve piston 171 and spring 154. When the accelerator pedal 169 is depressed, the throttle valve piston 152 is moved to the right against the action of the spring 153 and line pressure fluid enters the bore 151 through port 157 and flows through port 156 into the throttle pressure conduit 135. Throttle pressure in conduit 135 is returned to the bore 151 through the restriction 168 and port 158 where it acts on the differential area of lands 162 and 163. The force developed due to throttle pressure acting on the differential area of the lands 162 and 163 tends to force the valve piston 152 to the left so as to restrict the port 157. The pressure in conduit 135 therefore is regulated at a pressure that increases directly with the depression of the accelerator pedal 169 but is always less than line pressure.

The throttle modulator valve 109 comprises a casing portion 180 formed with a stepped longitudinal cylindrical bore 181, a valve piston 182, a valve plug 183 and a spring 184. The valve piston 182 is formed with a large land 185, two small lands 186 and 187, an elongated stem 188 and an annular groove 189 between lands 187 and 186. The casing portion 180 is formed with ports 190, 191, 192, 193, 194, 195 and 196 all opening into the bore 181. The ports 190 and 192 are connected to the conduit 138; port 193 is connected to the throttle pressure conduit 135; port 194 is connected through a restriction 197 to conduit 137; port 196 is connected to the governor pressure conduit 139; and ports 191 and 195 are bleed ports open to the sump 103.

Throttle pressure in conduit 135 is supplied to the left end of the primary regulator valve 104 where it causes line pressure to be regulated at a higher value proportional to the value of throttle pressure. Throttle pressure is also supplied through port 193 of the throttle modulator valve 109 where it acts against the right end of the valve plug 183 forcing it to the left and permitting fluid to pass through port 192 into conduit 138. Pressure in conduit 138 is supplied to the right end of the primary reguator valve 104 where it tends to cause line pressure in conduit 123 to be regulated at a lesser value proportional to this pressure. Throttle modulator pressure in the conduit 138 is also returned to the bore 181 through port 190 where it acts against the left end of the valve plug 183 and assists the spring 184 in forcing the valve plug 183 to the right tending to close off the port 192. The pressure in conduit 138 therefore is regulated initially at some pressure less than throttle pressure.

When the vehicle speed increases, governor pressure in conduit 139 is supplied through port 196 where it acts against the right end of the valve piston 182. As this governor pressure increases, the valve piston 182 is moved to the left and forces the valve plug 183 to the left opening the port 192. Thereafter, throttle pressure is admitted directly into the conduit 138 and is supplied to the right end of the primary regulator valve 104 thereby regulating line pressure in conduit 123 at some lower value.

As the modulator valve piston 182 is moved to the left under the infiluence of governor pressure, the land 186 effectively closes off the port 195 and the land 187 is moved sufficiently far to the left so that throttle pressure flows through the groove 189 into port 194 and through the restriction 197 into the conduit 137. Throttle pressure in the conduit 137 is returned to the bore 151 of the throttle valve 108 through port 159 where it acts on the differential area of lands 163 and 164. The force due to throttle pressure acting on this differential area tends to force the valve piston 152 to the left thereby tending to close the line pressure port 157 and thereafter regulating throttle pressure in conduit 135 at some lower value. The reduction in throttle pressure in conduits 135 and 138 causes the primary regulator valve 104 to regulate line pressure in conduit 123 at some lower value. The provision of conduit 137 for returning fluid pressure to the throttle valve 108 and the provision of the differential area of lands 163 and 164 is effective to extend the range of throttle pressure regulation. This permits greater control over the shift qualities of the transmission by more precise control of line pressure used to engage the various servomotors, and of the throttle pressure which partially controls the movement of the shift valves. In particular, the valves described are effective to increase line pressure for stall condition, that is, for initially overcoming the inertia of the vehicle and are effective thereafter to reduce line pressure after the vehicle speed increases and before any movement of the shift valves 115 or 116 occurs. Throttle pressure supplied to the shift valves 115 and 116 is effective to inhibit upshift until the governor pressure increase to some predetermined value.

The 1–2 shift valve 115 comprises a casing portion 200 formed with a stepped longitudinal cylindrical bore 201, valve pistons 202 and 203, and spring 204. The valve pistons 202 and 203 are disposed in line and the spring 204 tends to hold them to the left, in a down-shift condition, until governor pressure supplied to the left end of the valve piston 202 is sufficient to cause an up-shift. When the valve pistons 202 and 203 are moved to the right, line pressure in conduit 129 flows into conduit 146, and into the apply cavity 51a of the front brake servomotor 51. The front brake 19 is engaged and the one-way brake 21 overruns as previously described.

Provision is made for controlling the 1–2 up-shift and the 2–1 down-shift under various operating conditions as will now be described.

The 1–2 shift valve piston 203 is formed with lands 205, 206, 207 and 208 and annular grooves 209, 210 and 211 between the lands. The lands 205 and 206 are of the same diameter and the lands 207 and 208 are of successively increasing diameters. The casing portion 200 is formed with ports 212, 213, 214, 215, 216 and 217 all opening into the bore 201. Port 212 is connected to conduit 147; ports 214 and 216 are connected to conduit 136; ports 213 and 217 are interconnected by the channel or conduit 148; and port 215 is a bleed port opened to the sump 103.

The 2–3 shift valve 116 comprises a casing portion 220 formed with a stepped longitudinal cylindrical bore 221, a valve piston 222, a valve plug 223 and springs 224 and 225. The casing portion 220 is formed with ports 226, 227, 228 and 229 all opening into the bore 221. The ports 226 and 228 are connected to conduit 147; port 227 is connected to conduit 136; and port 229 is connected to the throttle pressure conduit 135.

The down-shift valve 107 comprises the valve piston 171 disposed within the bore 151 and is moved by the accelerator pedal 169 and acts upon the throttle valve piston 152 through the spring 154. The valve piston 171 is formed with lands 230 and 231 and an annular groove 232 between the lands. The casing portion 150 is formed with ports 233, 234 and 235 all openings into the bore 151. The port 234 is connected to conduit 136; port 235 is connected to the throttle pressure conduit 135; and port 233 is a bleed port open to the sump 103.

In operation, the throttle valve 108 supplies throttle pressure through conduit 135 to the right end of 2–3 shift valve 116 through port 229. This pressure acts against the valve plug 223 and forces it to the left against the action of spring 225. Movement of the plug 223 to the left restricts the port 227 and opens the port 228 permitting throttle pressure to enter the conduit 147. Fluid in the conduit 147 is returned through port 226 into bore 221 where it assists the spring 225 in tending to force the plug 223 to the right. The plug 223 thereafter regulates the pressure within the conduit 147 at some value less than throttle pressure. The pressure in conduit 147 will hereinafter be referred to as throttle valve plug pressure.

Fluid pressure existing in conduit 147 is supplied through port 212 of the 1–2 shift valve where it flows through the groove 209, port 213, channel 148 and port 217 into the right end of the bore 201 where it assists the spring 204 in holding the piston 203 in a down-shift condition. A normal or light throttle up-shift occurs when governor pressure acting against the left end of the piston 202 is sufficient to force the pistons 202 and 203 to the right against the action of spring 204 and throttle valve plug pressure acting against the right end of the valve piston 203.

A forced throttle 1-2 up-shift is provided at a different shift point by the action of the downshift valve 107. Throttle pressure inhibits up-shift and increasing throttle pressure in kick-down condition inhibits up-shift even more. Provision is made herein to partially counteract the effects of increased throttle pressure. In the forced throttle condition, the accelerator pedal 169 is depressed substantially to its limit and the valve piston 171 is moved to the right. The land 230 blocks the port 233 and the land 231 opens the port 235 permitting throttle pressure to flow from conduit 135 through the groove 232 and port 234 into conduit 136. The throttle valve piston 152 is also moved to the right so that throttle pressure increases. Throttle pressure in conduit 136 in this condition may be referred to as kick-down pressure and is supplied through port 227 into the bore 221 of the 2-3 shift valve 116 and through port 226 into conduit 147. Kickdown pressure in conduit 136 is also supplied through port 216 of the 1-2 shift valve 115 where it acts on the differential area of lands 207 and 208. The force due to kickdown pressure acting on the differential area of lands 207 and 208 assists governor pressure in overcoming the action of spring 204 and the force due to kickdown pressure acting on the right end of the valve piston 203 so that an up-shift occurs at a different point than for a normal light throttle up-shift.

A forced throttle 2-1 down-shift is also provided and is obtained as follows:

The 1-2 shift valve pistons 202 and 203 have been moved to an up-shift condition by governor pressure. Under light throttle conditions, the conduit 136 is open to the sump 103 through ports 233 and 234 of the downshift valve 107. Below some predetermined vehicle speed, a 2-1 down-shift is obtainable by depressing the accelerator pedal 169 substantially to its lower limit. This is effective to move the valve piston 171 to the right so that the port 233 is blocked and kickdown pressure is admitted into conduit 136. Kickdown pressure is supplied through port 214 of the 1-2 shift valve 115 and flows through the groove 209, port 213, channel 148 and port 217 to the right end of the shift valve piston 203 where it tends to force the piston 202 to a down-shift condition. Kickdown pressure in conduit 136 is also supplied through port 216 where it acts on the differential area of lands 206 and 208. Since land 208 is slightly larger than land 206, the force due to the pressure acting on the differential area tends to inhibit a down-shift. The differential area of lands 208 and 207 however is less than the differential area of lands 206 and 208 so that a forced throttle down-shift does not occur at the same point at which a forced throttle up-shift occurs.

There has been provided by this invention an improved hydraulic control system for an automatic transmission. The system provides for increasing line pressure under stall or break-away conditions and is effective to decrease line pressure as vehicle speed increases. The system provides valve means operable under the influence of the vehicle throttle actuator to extend the effective range of throttle pressure for thereby controlling the shift points of the transmission. This system also provides valve means effective to control the shift points of the 1-2 up-shift under light throttle and under forced throttle, and also control the forced throttle 2-1 down-shift. The control system thereby provides for smooth operation of the transmission under varying conditions of vehicle speeds and throttle depressions.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. In a hydraulic control system for an automatic transmission adapted to be used in an automotive vehicle having a driving engine with a throttle and a throttle actuator, the combination of a source of fluid pressure for supplying line pressure fluid to the control system, a pressure regulator valve for regulating line pressure, a throttle actuator responsive valve connected to said source for supplying a pressure responsive to throtlte actuator position to said regulator valve, a modulating valve supplied with fluid from said throttle valve and connected to supply a modified throttle pressure to said regulator valve and to return fluid to said throttle valve where it acts on said throttle valve for regulating throttle pressure at some lower value.

2. In a hydraulic control system for an automatic transmission adapted to be used in an automotive vehicle having a driving engine with a throttle and a throttle actuator for controlling the engine, the combination of a source of fluid pressure for supplying line pressure fluid to the system, a pressure regulator valve for regulating line pressure, a throttle valve connected to be responsive to throttle actuator position and supplied with fluid pressure from said source and connected to supply a regulated fluid pressure to one end of said pressure regulator valve, a modulator valve supplied with fluid pressure from said throttle valve and connected to supply a modified fluid pressure to the other end of said pressure regulator valve, conduit means connecting said modulator valve back to said throttle valve, and vehicle speed responsive means connected to supply a fluid pressure which increases with the speed of the vehicle to said modulator valve, said last named fluid pressure being effective above some predetermined speed of the vehicle to actuate said modulator valve and cause fluid pressure to be supplied from said modulator valve to said throttle valve, the pressure from said modulator valve acting on said throttle valve for thereafter regulating throttle pressure at some lesser value.

3. In a transmission mechanism for an automotive vehicle having an engine and a throttle and throttle actuator for controlling the engine, the combination of a drive shaft, a driven shaft, means including a first fluid pressure actuated servomotor for completing a low speed power train between said shafts, means including a second fluid pressure actuated servo motor for completing a second speed power train between said shafts, a source of fluid pressure connectible to supply fluid to said servo motors, a shift valve supplied with fluid from said source and operable to direct fluid from said source to said servo motors for completing the power trains, said shift valve having a downshifted position in which said low speed power train is completed and an upshifted position in which said second speed power train is completed, a throttle valve connected to said throttle actuator and to said source and adapted to supply a throttle pressure to said shift valve that varies with throttle actuator position, said shift valve having two lands thereon defining a differential area, said throttle valve being connected to supply throttle pressure to said differential area during forced throttle depression to urge said shift valve to its upshifted position whereby shifts from said low speed power train to said second speed power train occur at different points for relatively light throttle actuator depression and for forced throttle depression.

4. In a hydraulic control system for an automatic transmission adapted to be used in an automotive vehicle having a driving engine with a throttle and a throttle actuator, the combination of a source of fluid pressure for supplying fluid to the system, means including a first hydraulic servomotor for completing a low speed power train through the transmission, means including a second hydraulic servomotor for completing a second speed power train through the transmission, a shift valve connected to said source and operable to direct fluid to said servomotors, vehicle speed responsive means connected to supply a fluid pressure which increases with the speed of the vehicle to said shift valve to cause upshift movement thereof, a throttle actuator responsive valve supplied with fluid from said source and connected to supply fluid to said shift valve to inhibit upshift movement thereof, said shift valve being formed wtih lands of different areas connectible when said throttle actuator is fully depressed to be acted upon by pressure from said throttle valve to aid said vehicle speed responsive fluid pressure in causing upshift movement of said shift valve, whereby upshift motion of said valve occurs at different vehicle speeds for relatively light throttle depression and for forced throttle depression.

5. In a hydraulic control system for an automatic transmission as described in claim 4 wherein said shift valve is formed with additional lands having a greater differential area than said first-mentioned lands connectible to be responsive to pressure from said throttle valve and effective to cause a forced throttle downshift from second to low speed drive to occur at a different vehicle speed from either the light throttle or forced throttle upshifts.

References Cited in the file of this patent

UNITED STATES PATENTS

| | | |
|---|---|---|
| 2,846,900 | McFarland et al. | Aug. 12, 1958 |
| 3,001,415 | Smirl | Sept. 26, 1961 |
| 3,004,446 | Flinn | Oct. 17, 1961 |

UNITED STATES PATENT OFFICE
CERTIFICATE OF CORRECTION

Patent No. 3,118,320            January 21, 1964

John S. Ivey

It is hereby certified that error appears in the above numbered patent requiring correction and that the said Letters Patent should read as corrected below.

Column 3, line 53, for "Fuid" read -- Fluid --; line 56, for "conduct" read -- conduit --; column 7, line 49, for "202" read -- 203 --.

Signed and sealed this 16th day of June 1964.

(SEAL)
Attest:

ERNEST W. SWIDER            EDWARD J. BRENNER
Attesting Officer            Commissioner of Patents